United States Patent

Ngoc et al.

[11] Patent Number: 5,552,468
[45] Date of Patent: *Sep. 3, 1996

[54] RUBBERY BLEND HAVING LOW PERMANENT COMPRESSION SET

[75] Inventors: Hung D. Ngoc, Limeil Brevannes; Guy P. R. Duval, Paris, both of France

[73] Assignee: The Goodyear Tire & Rubber Company, Akron, Ohio

[*] Notice: The term of this patent shall not extend beyond the expiration date of Pat. No. 5,362,787.

[21] Appl. No.: 334,991

[22] Filed: Nov. 7, 1994

Related U.S. Application Data

[63] Continuation of Ser. No. 154,053, Nov. 18, 1993, Pat. No. 5,362,787.

[51] Int. Cl.$^6$ .................................................. C08L 9/02
[52] U.S. Cl. .................... 524/297; 525/233; 526/336; 526/338; 526/323.2
[58] Field of Search ..................... 524/297; 526/323.2, 526/336, 338; 525/233

[56] References Cited

U.S. PATENT DOCUMENTS

| | | | |
|---|---|---|---|
| 3,544,488 | 12/1970 | Corte et al. | 260/2.2 |
| 4,244,852 | 1/1981 | Prem et al. | 260/31.8 |
| 4,404,326 | 9/1983 | Chang | 525/223 |
| 4,486,480 | 12/1984 | Okumoto et al. | 525/233 |
| 5,057,566 | 10/1991 | Kobayashi et al. | 524/297 |

FOREIGN PATENT DOCUMENTS

| | | | |
|---|---|---|---|
| 0353525 | 2/1990 | European Pat. Off. | |
| 928069 | 5/1955 | Germany | |
| 2011756 | 1/1987 | Japan | 525/233 |
| 2011788 | 1/1987 | Japan | 525/233 |

*Primary Examiner*—Paul R. Michl
*Assistant Examiner*—Olga Asinovsky
*Attorney, Agent, or Firm*—Alvin T. Rockhill

[57] ABSTRACT

Seals for automotive body applications (such as, windows, hoods, trunks and doors) and building applications (such as, window glazing gaskets and weather strips) should be dimensional stable, provide low compression set, and offer outstanding sealing characteristics over a broad temperature range. They must be capable of sealing out noise, wind and water, while providing long-term ultraviolet light resistance. This invention discloses a highly crosslinked nitrile rubber composition which can be easily blended with polyvinyl chloride to make compositions having excellent characteristics for automotive body seals and building industry applications including dimensional stability, low compression set, outstanding sealing characteristics, good low temperature flexibility, and good recyclability, said highly crosslinked nitrile rubber composition being comprised of (1) a highly crosslinked nitrile rubber having repeat units which are derived from (a) 1,3-butadiene, (b) acrylonitrile, and (c) a crosslinking agent, wherein said highly crosslinked nitrile rubber has a Mooney viscosity of about 50 to about 120, a swelling index of less than about 10 percent, a mill shrinkage of less than 10 percent, and a gel content of greater than 90 percent; and (2) from about 1 to about 30 phr of a plasticizer.

10 Claims, No Drawings

RUBBERY BLEND HAVING LOW PERMANENT COMPRESSION SET

This is a Continuation of application Ser. No. 08/154,053, filed on Nov. 18, 1993, U.S. Pat. No. 5,362,787.

BACKGROUND OF THE INVENTION

Seals for automotive body applications (such as, windows, hoods, trunks and doors) and building applications (such as window glazing gaskets and weather strips) should be dimensional stable, provide low compression set, and offer outstanding sealing characteristics over a broad temperature range. Such seals must be capable of sealing out noise, wind and water, while providing long-term ultraviolet light resistance. At the same time the material used in the seal must offer the degree of flexibility required for the particular application. Window and door weather stripping for automobiles and trucks is a high volume application for such seals. However, seals offering essentially the same characteristics are also needed for sun roof seals, handle gaskets, window spacers, window guides, lock seals, windshield wiper pivot seals and in building applications such as window glazing gaskets and weather seals.

Rubbery blends of polyvinyl chloride (PVC) with a nitrile rubber (NBR) have sometimes been used in seals for automotive body applications. The nitrile rubber is included in such blends as a permanent modifier for the PVC which provides it with a higher degree of flexibility. However, the utilization of standard nitrile rubber in such blends typically results in only moderate compression set characteristics. It is very important for seals to have good compression set characteristics in most applications. For instance, improved resistance to water leaks and wind noise can be attained by utilizing a seal which has low compression set characteristics.

It is known from the teachings of UK Patent Application No. 9214969.9 that low compression set characteristics can be improved by utilizing a technique known as "dynamic vulcanization" via free radical generators, such as azo compounds or organic peroxides. However, this "dynamic vulcanization" technique suffers from the weakness that the azo compounds or organic peroxides required reduce the thermal stability of the polyvinylchloride resin and the ultraviolet light resistance of the nitrile rubber. There is also an increased risk of early crosslinking during processing which leads to scorching and reduced recyclability.

The automotive industry is currently moving toward cost reduction wherever it is possible without sacrificing quality. From a cost standpoint blends of nitrile rubber with polyvinylchloride are an attractive substitute for much more expensive materials which are widely used in automotive body seals. For this reason the development of a nitrile rubber which could be blended easily with polyvinylchloride to attain low compression set while maintaining dimensional stability, low temperature flexibility, and outstanding sealing characteristics would be warmly greeted.

SUMMARY OF THE INVENTION

The present invention relates to a highly crosslinked nitrile rubber which can be easily blended with PVC to make compositions which have an excellent combination of properties for use in making seals and gaskets for automotive and building applications. The PVC blends made with the highly crosslinked nitrile rubbers of this invention offer excellent dispersion behavior, dimensional stability, low compression set, outstanding sealing characteristics, and low temperature flexibility.

This invention more specifically discloses a highly crosslinked nitrile rubber composition which can be blended with polyvinyl chloride to make compositions having excellent characteristics for seals and gaskets including dimensional stability, low compression set, outstanding sealing characteristics, and good low temperature flexibility, said highly crosslinked nitrile rubber composition being comprised of (1) a highly crosslinked nitrile rubber having repeat units which are derived from (a) 1,3-butadiene, (b) acrylonitrile, and (c) a crosslinking agent, wherein said highly crosslinked nitrile rubber has a Mooney viscosity of about 50 to about 120, a swelling index of less than about 10 percent, a mill shrinkage of less than 10 percent, and a gel content of greater than 90 percent; and (2) from about 1 to about 30 phr of a plasticizer.

The present invention also discloses a rubbery composition which is useful in automotive body seal applications which is comprised of (1) polyvinyl chloride, (2) from about 20 to about 120 parts of a plasticizer per 100 parts of the polyvinylchloride, (3) from about 1 to about 3 parts of a stabilizer, and (4) from about 5 to about 300 parts of a highly crosslinked nitrile rubber composition per 100 parts of the polyvinyl chloride, wherein the highly crosslinked nitrile rubber composition is comprised of a highly crosslinked nitrile rubber and from about 1 to about 30 parts of a plasticizer, wherein the highly crosslinked nitrile rubber has repeat units which are derived from (a) 1,3-butadiene, (b) acrylonitrile, and (c) a crosslinking agent, and wherein said highly crosslinked nitrile rubber has a Mooney viscosity of about 50 to about 120, a swelling index of less than about 10 percent, a mill shrinkage of less than 10 percent, and a gel content of greater than 90 percent. The rubbery composition can also optionally contain fillers and/or additional conventional ingredients, such as processing aids, lubricants, and pigments.

The subject invention further reveals a body seal for automotive applications which is comprised of a blend of (1) polyvinyl chloride, (2) from about 20 to about 120 parts of a liquid plasticizer per 100 parts of the polyvinylchloride, (3) from about 1 to about 3 parts of a stabilizer, and (4) from about 5 to about 300 parts of a highly crosslinked nitrile rubber composition per 100 parts of the polyvinyl chloride, wherein the highly crosslinked nitrile rubber composition is comprised of a highly crosslinked nitrile rubber and from about 1 to about 30 parts of a plasticizer, wherein the highly crosslinked nitrile rubber has repeat units which are derived from (a) 1,3-butadiene, (b) acrylonitrile, and (c) a crosslinking agent, and wherein said highly crosslinked nitrile rubber has a Mooney viscosity of about 50 to about 120, a swelling index of less than about 10 percent, a mill shrinkage of less than 10 percent, and a gel content of greater than 90 percent. The blend can also optionally contain fillers and/or additional conventional ingredients, such as processing aids, lubricants, and pigments.

DETAILED DESCRIPTION OF THE INVENTION

The highly crosslinked nitrile rubbers of this invention are synthesized utilizing a free radical emulsion polymerization technique. These highly crosslinked nitrile rubbers are comprised of repeat units which are derived from (a) 1,3-butadiene, (b) acrylonitrile, and (c) a crosslinking agent. The crosslinking agent is typically a multi-functional acrylate, a multi-functional methacrylate or divinylbenzene. Some specific examples of crosslinking agents which can be used include ethylene glycol methacrylate, trimethylol propane trimethacrylate (TRIM), divinylbenzene (DVB), and 1,4-butanediol dimethacrylate.

Technically, the highly crosslinked nitrile rubbers of this invention contain repeat units (chain linkages) which are derived from (a) 1,3-butadiene, (b) acrylonitrile, and (c) a crosslinking agent. These repeat units differ from the monomers that they were derived from in that they contain one less carbon-carbon double bond than is present in the respective monomer. In other words, a carbon-to-carbon double bond is consumed during the polymerization of the monomer into a repeat unit in the rubbery polymer. Thus, in saying that the rubbery polymer contains various monomers in actuality means that it contains repeat units which are derived from those monomers.

The highly crosslinked nitrile rubbers of this invention will normally contain (a) from about 45 weight percent to about 79 weight percent butadiene, (b) from about 20 weight percent to about 50 weight percent acrylonitrile, and (c) from about 0.5 weight percent to about 5 weight percent of a crosslinking agent. Such highly crosslinked nitrile rubbers will preferably contain (a) from about 58 weight percent to about 71 weight percent butadiene, (b) from about 28 weight percent to about 38 weight percent acrylonitrile, and (c) from about 1 weight percent to about 4 weight percent of the crosslinking agent. The highly crosslinked nitrile rubber will more preferably contain from about 1.5 weight percent to about 3.5 weight percent of the crosslinking agent. The percentages reported in this paragraph are based upon the total weight of the highly crosslinked nitrile rubber.

The preferred amount of crosslinking agent will vary with the polymerization technique employed in synthesizing the highly crosslinked nitrile rubber. As a general rule, higher levels of the crosslinking agent are needed at lower polymerization temperatures. By the same token lower levels of the crosslinking agent are needed in cases where higher polymerization temperatures are employed. The percentages reported in this paragraph are based upon the total weight of the highly crosslinked nitrile rubber.

A wide variety of crosslinking agents can be utilized in carrying out the polymerizations of this invention. Some representative examples of crosslinking agents which can be utilized include difunctional acrylates, difunctional methacrylates, trifunctional acrylates, trifunctional methacrylates, and divinylbenzene. 1,4-butanediol dimethacrylate has proven to be particularly useful as the crosslinking agent.

The highly crosslinked nitrile rubbers of the present invention are normally synthesized in an aqueous reaction medium by utilizing a free radical polymerization technique. Optionally, redox initiator systems can be employed in the synthesis of the highly crosslinked nitrile rubber. The reaction mixture utilized in such free radical emulsion polymerization techniques is comprised of water, 1,3-butadiene monomer, acrylonitrile monomer, a suitable free radical initiator, a crosslinking agent, a chain modifier, and one or more emulsifying agents.

The modifier will normally be a mercaptan, such as t-dodecylmercaptan. The chain modifier will normally be present in an amount which is within the range of about 0.1 phm to 1 phm (parts by weight per 100 parts by weight of monomer). At low polymerization temperatures relatively low amounts of the modifier are required. At high polymerization temperatures higher amounts of the modifier are required. The modifier level can be adjusted to obtain the desired rubber Mooney viscosity.

The reaction mixture utilized in this polymerization technique will normally contain from about 10 weight percent to about 80 weight percent monomers (1,3-butadiene, Acrylonitrile, and the crosslinking agent), based upon the total weight of the reaction mixture. The reaction mixture will preferably contain from about 20 weight percent to about 70 weight percent monomers and will more preferably contain from about 30 weight percent to about 50 weight percent monomers.

The emulsifiers used in the polymerization of such polymers may be charged at the outset of the polymerization or may be added incrementally or by proportioning as the reaction proceeds. Generally, anionic emulsifier systems provide good results, however, any of the general types of anionic, cationic or nonionic emulsifiers may be employed in the polymerization.

Generally from about 1 to about 6 phm (parts by weight per 100 parts by weight of monomer) of the emulsifier is utilized in preparing the aqueous reaction mixture utilized in the emulsion polymerization technique. It has been determined that the use of less than about 1 phm of surfactant can lead to latex instability. On the other hand, the utilization of more than about 6 phm of surfactant can lead to isolation problems. In most cases, it will be preferred to utilize from about 2 phm to about 4 phm of the emulsifier. The precise amount of emulsifier required in order to attain optimal results will, of course, vary with the specific emulsifier being used and with the monomer ratios being employed. However, persons skilled in the art will be able to easily ascertain the specific amount of emulsifier required in order to attain optimal results.

Among the anionic emulsifiers that can be employed in emulsion polymerizations are fatty acids and their alkali metal soaps such as caprylic acid, capric acid, pelargonic acid, lauric acid, undecyclic acid, myristic acid, palmitic acid, margaric acid, stearic acid, arachidic acid, and the like; amine soaps of fatty acids such as those formed from ammonia, mono- and dialkyl amines, substitute hydrazines, guanidine, and various low molecular weight diamines; chain-substituted derivatives of fatty acids such as those having alkyl substituents; napthenic acids and their soaps and the like; sulfuric esters and their salts, such as the tallow alcohol sulfates, coconut alcohol sulfates, fatty alcohol sulfates, such as oleyl sulfate, sodium lauryl sulfate and the like; sterol sulfates, sulfates of alkylcyclohexanols, sulfation products of lower polymers of ethylene as $C_{10}$ to $C_{20}$ straight chain olefins, and other hydrocarbon mixtures, sulfuric esters of aliphatic and aromatic alcohols having intermediate linkages, such as ether, ester, or amide groups such as alkylbenzyl (polyethyleneoxy) alcohols, the sodium salt of tridecyl ether sulfate; alkane sulfonates, esters and salts, such as alkylchlorosulfonates with the general formula $RSO_2Cl$, wherein R is an alkyl group having from 1 to 20 carbon atoms, and alkylsulfonates with the general formula: $RSO_2$—OH, wherein R is an alkyl group having from 1 to 20 carbon atoms; sulfonates with intermediate linkages such as ester and ester linked sulfonates such as those having the formula $RCOOC_2H_4SO_3H$ and $ROOC$—$CH_2$—$SO_3H$, wherein R is an alkyl group having from 1 to 20 carbon atoms such as dialkyl sulfosuccinates; ester salts with the general formula:

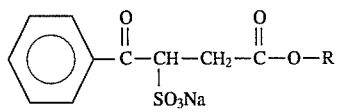

wherein R is an alkyl group having from 1 to 20 carbon atoms; alkaryl sulfonates in which the alkyl groups contain preferably from 10 to 20 carbon atoms, e.g., dodecylbenzenesulfonates, such as sodium dodecylbenzenesulfonate; alkyl phenol sulfonates; sulfonic acids and their salts such as acids with the formula $RSO_3Na$, wherein R is an alkyl and the like; sulfonamides, sulfamido methylenesulfonic acids; rosin acids and their soaps; sulfonated derivatives of rosin and rosin oil; and lignin sulfonates, and the like.

Rosin acid soap has been used with good success at a concentration of about 5 percent by weight in the initial charge composition used in the synthesis of carboxylated elastomers. Of rosin acids, about 90 percent are isometric with abietic acid and the other 10 percent is a mixture of dehydro abietic acid and dihydro abietic acid.

Sulfonate surfactants are particularly useful as emulsifying agents (soaps) in the practice of this invention. Sulfonate surfactants are commercially available from a wide variety of sources. For instance, Du Pont sells sodium alkylarylsulfonate under the tradename Alkanol™, Browning Chemical Corporation sells sodium dodecylbenzene sulfonates under the tradename Ufaryl™ D1-85, and Ruetgers-Nease Chemical Company sells sodium cumene sulfonate under the tradename Naxonate Hydrotrope™. Some representative examples of sulfonate surfactants which can be used include sodium toluene-xylene sulfonate, sodium toluene sulfonate, sodium cumene sulfonates, sodium decyldiphenylether sulfonate, sodium dodecylbenzenesulfonate, sodium dodecyldiphenylether sulfonate, sodium 1-octane sulfonate, sodium tetradecane sulfonate, sodium pentadecane sulfonate, sodium heptadecane sulfonate, and potassium toluene sulfonate.

Metal salts of alkylbenzene sulfonates are a highly preferred class of sulfonate surfactant. The metal will generally be sodium or potassium with sodium being preferred. Sodium salts of alkylbenzene sulfonates have the structural formula:

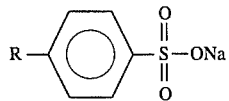

wherein R represents an alkyl group containing from 1 to about 20 carbon atoms. It is preferred for the alkyl group to contain from about 8 to about 14 carbon atoms.

The free radical polymerization technique utilized in this synthesis is normally initiated by including a free radical initiator in the reaction mixture. Virtually, any type of compound capable of generating free radicals can be utilized as the free radical initiator. The free radical generator is normally employed at a concentration within the range of about 0.01 phm to about 1 phm. The free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutylronitrile, 2-t-butylazo-1-cyanocyclohexane, 1-t-amylazo-1-cyanocyclohexane, and the like, the various alkyl perketals, such as 2,2-bis-(t-butylperoxy)butane, and the like. Water soluble peroxygen free radical initiators are especially useful in such aqueous polymerizations.

The emulsion polymerizations of this invention are typically carried out at a temperature ranging between about 2° C. and about 70° C. At temperatures below 0° C. the aqueous polymerization mixture can freeze and at temperatures above 70° C. the polymerization reaction becomes difficult to control. It is generally preferred to conduct the polymerization at a temperature which is within the range of about 5° C. to about 50° C.

In most cases, the polymerization will be continued until a high monomer conversion of at least about 90% has been attained. It is normally preferred to allow the polymerization to continue until a monomer conversion of at least about 95% has been attained. It is generally most preferred to allow the polymerization to continue until a monomer conversion which is within the range of about 96% to about 99% has been attained. At this point, the polymerization reaction is shortstopped with a conventional shortstopping agent, such as hydroquinone.

After the shortstopping agent has been added is a good time to add conventional antioxidants to the latex. It is also important to add a plasticizer to the latex at this point. Normally from about 1 to about 30 phr (parts by weight per 100 parts by weight of the rubber) of the plasticizer will be added. It is generally preferred to add from about 5 phr to about 20 phr of the plasticizer.

A wide variety of plasticizers which are compatible with the polyvinyl chloride resins can be employed. The plasticizers employed will normally be in the liquid state. Some representative examples of plasticizers which are highly suitable for this application include abietic derivatives, such as hydroabietyl alcohol, methyl abietate and hydrogenated methyl abietate; acetic acid derivatives, such as cumylphenyl acetate; adipic acid derivatives, such as benzyloctyl adipate, dibutyl adipate, diisobutyl adipate, di-(2-ethylhexyl) adipate, diisononyl adipate, diisooctyl adipate, dinonyl adipate, $C_{7-9}$ linear adipate, dicapryl adipate, octyl decyl adipate (n-octyl, n-decyl adipate), straight chain alcohol adipate, didecyl adipate (diisodecyl adipate), dibutoxyethyl adipate, high molecular weight adipate, polypropylene adipate, modified polypropylene adipate; azelaic acid derivatives, such as dicyclohexyl azelate, di-(2-ethylhexyl) azelate, di-n-hexyl azelate, diisooctyl azelate; benzoic acid derivatives such as diethylene glycol dibenzoate, dipropylene glycol dibenzoate, diethylene glycol benzoate and dipropylene glycol benzoate blend, neopentyl glycol dibenzoate, glyceryl tribenzoate, timethylolethane tribenzoate, pentaerythritol tribenzoate, cumylphenyl benzoate; polyphenyl derivatives such as hydrogenated terphenyl; citric acid derivatives, such as triethyl citrate, tri-n-butyl citrate, acetyl triethyl citrate, acetyl tri-n-butyl citrate, acetal tributyl citrate; epoxy derivatives such as butyl epoxy stearate, alkyl epoxy stearate, epoxidized butyl ester, epoxidized octyl tallage, epoxidized triglyceride, epoxidized soya bean oil, epoxidized sunflower oil, epoxidized linseed oil, epoxidized tallate ester, 2-ethylhexylepoxy tallate, octyl epoxy stearate; proprietary esters and mixed ester; ether derivatives, such as cumylphenyl benzyl ether; formal derivatives such as butyl carbitol formal; fumaric acid derivatives, such as dibutyl fumarate, diisooctyl fumarate, dioctyl fumarate; glutaric acid derivatives such as mixed dialkyl glutarates and dicumylphenyl glutarate; glycol derivatives such as diethylene glycol dipelargonate, triethylene glycol dipelargonate, triethylene glycol di-(2-ethylbutyrate), triethylene glycol di-caprylatecaprate, triethylene glycol di-(2-ethylhexoate), triethylene glycol dicaprylate, tetraethylene glycol dicaprylate, polyethylene glycol di-(2-ethylhexoate), butyl phthalyl butyl glycolate, triglycolester of vegetable oil fatty acid, triethylene glycol ester of fatty acid; linear dibasic acid derivatives such as mixed dibasic ester; petroleum derivatives such as aromatic hydrocarbons; isobutyric acid derivatives such as 2,2,4-trimethyl-1,3-pentanediol diisobutyrate; isophthalic acid derivatives such as di(2-ethylhexyl) isophthalate, diisooctyl isophthalate, dioctylisophthalate; lauric acid derivatives such as butyllaurate, 1,2-propylene glycol monolaurate, ethylene glycol monoethyl ether laurate, ethylene glycol monobutyl ether laurate, glycerol monolaurate, polyethylene glycol-400-dilaurate; mellitic acid derivatives such as n-octyl, n-decyl trimellitate, tri-n-octyl-n-decyl trimellitate, triisononyl trimellitate, triisooctyl trimellitate, tricapryl trimellitate, diisooctyl monoisodecyl trimellitate, triisodecyl trimellitate, tri($C_{7-9}$ alkyl) trimellitate, trio2-ethylhexyl trimellitate; nitrile derivatives such as fatty acid nitrile; oleic acid derivatives such as butyl oleate, 1,2-propylene glycol mono oleate, ethylene glycol monobutyl ether oleate, tetrahydrofurfuryl oleate, glyceryl monoleate; paraffin derivatives such as chlorinated paraffins, diethylene glycol dipelargonate, triethylene glycol dipelargonate, 2-butoxyethyl dipelargonate; phenoxy plasticizers such as acetyl paracumyl phenol; phosphoric acid derivatives such as tri-(2-ethylhexyl) phosphate, tributoxyethyl phosphate, triphenyl phosphate, cresyl diphenyl phosphate, tricresyl phosphate, tri-isopropylphenyl phosphate, alkyl aryl phosphates, diphenyl-xylenyl phosphate, phenyl isopropylphenyl phosphate; phthalic acid derivatives such as alkyl benzene phthalates, dimethyl phthalate, dibutyl phthalate, diisobutyl phthalate, dihexyl phthalate, butyl octyl phthalate, butyl isodecyl phthalate, butyl iso-hexyl phthalate, diisononyl phthalate, dioctyl phthalate, di-(2-ethyl hexyl) phthalate, n-octyl-n-decyl phthalate, hexyl octyl decyl phthalate, didecyl phthalate diisodecyl phthalate, diisodecyl phthalate, diundecyl phthalate, butyl-ethylhexyl phthalate, butylbenzyl phthalate, octylbenzyl phthalate, dicyclohexyl phthalate, diphenyl phthalate, alkylaryl phthalates and 2-ethylhexylisodecyl phthalate; ricinoleic acid derivatives such as methylacetyl ricinoleate, n-butyl acetyl ricinoleate, glyceryl triacetyl ricinoleate; sebacic acid derivatives such as dimethyl sebacate, dibutyl sebacate, and dibutoxyethyl sebacate; stearic acid derivatives such as glyceryl tri-acetoxy stearate, butyl acetoxy stearate, methylpentachlorostearate, and methoxyethyl acetoxy stearate; sucrose derivatives such as sucrose benzoate; sulfonic acid derivatives such as alkylsulfonic esters of phenol; tall oil derivatives such as methylester of tall oil and isooctyl ester of tall oil; and terephthalic acid derivatives such as dioctyl terephthalate.

After the plasticizer and optionally an antioxidant are added to the latex the highly crosslinked nitrile rubber composition made by the emulsion polymerization process is recovered from the emulsion (latex). This can be accomplished by utilizing standard coagulation techniques. For instance, coagulation can be accomplished by the addition of salts, acids, or both to the latex.

A review of coagulation technies for nitrile rubbers is presented in Hofmann, Werner "Nitrile Rubber", *Rubber Chemistry and Technology*, Vol. 37, No. 2, part 2 (April–June 1964), pp. 94–96, which is incorporated herein by reference. Many of these coagulation techniques will be useful for the highly crosslinked nitrile rubbers of this invention. Coagulation with acid or blends of salts with acids is usually very satisfactory. For example, sulfuric acid, hydrochloric acid, blends of sodium chloride with sulfuric acid, and blends of hydrochloric acids with methanol are very effective as coagulating agents for nitrile rubber emulsions. Calcium chloride solutions which are free of calcium hydroxide can also be used as coagulants with good success.

After coagulation washing may be employed to remove excess soap and/or electrolyte from the rubber. Sometimes washing is also useful in adjusting the pH of the elastomer that has been synthesized. After washing, the elastomer will normally be dewatered and dried.

The highly crosslinked nitrile rubber made by the emulsion polymerization technique of this invention will normally have a gel content of greater than about 90%, a swelling index of less than about 10%, a mill shrinkage of less than about 10%, and a Mooney viscosity of about 50 to about 120. The highly crosslinked nitrile rubber will preferably have a gel content of greater than about 95%, a swelling index of less than about 7%, a mill shrinkage of less than about 8%, and a Mooney viscosity of about 55 to about 110. The highly crosslinked nitrile rubber will more preferably have a mill shrinkage of less than about 5%. For purposes of this patent application the gel content and swelling index of the highly crosslinked nitrile rubber are determined by ASTM Test Method D3618-88. Mill shrinkage is determined by ASTM Test Method D1917.

It is advantageous to convert the highly crosslinked nitrile rubber composition into a powder to facilitate its usage in making blends with polyvinyl chloride. In such cases, it will be beneficial to add a partitioning agent to the highly crosslinked nitrile rubber composition. Some representative examples of partitioning agents which can be employed include calcium carbonate, polyvinyl chloride resin, zinc stearate, calcium stearate, and silica. Calcium carbonate is a highly desirable partitioning agent which can be utilized in such applications.

The highly crosslinked nitrile rubber compositions of this invention can be blended with polyvinylchloride to make rubbery compositions which have excellent characteristics for automotive body seals and building industry applications including dimensional stability, low compression set, good low temperature flexibility, and outstanding sealing characteristics. These rubbery compositions can be prepared by blending the highly crosslinked nitrile rubber composition into polyvinylchloride (PVC) and other ingredients utilizing standard mixing techniques. It is highly preferred for the highly crosslinked nitrile rubber composition to be in powdered form when blended into PVC.

The highly crosslinked nitrile rubber compositions of this invention can be easily mixed into polyvinylchloride to make the rubbery compositions of this invention by employing standard mixing procedures. For example the highly crosslinked rubber compositions can be mixed into polyvinylchloride and other ingredients in a Banbury mixer or with an extruder. Such rubbery compositions typically contain from about 5 parts by weight to about 300 parts by weight of the highly crosslinked nitrile rubber composition per 100 parts by weight of the polyvinylchloride. It is typically preferred for such rubbery compositions to contain from about 50 to about 200 parts by weight of the highly crosslinked nitrile rubber composition per 100 parts by weight of the polyvinylchloride.

The rubbery compositions of this invention are useful in a wide variety of applications. More specifically, they have been found to be extremely valuable when used in making seals and gaskets for automotive and building applications. For example, weather stripping for automobile doors and windows as well as window glazing seals for homes and other buildings can be made with the rubbery compositions of this invention. Sun roof seals, handle gaskets, window spacers, window guides, lock seals, and windshield wiper pivot seals for automobiles and trucks can also be made with the rubbery compositions of this invention.

Such seals and gaskets can easily be made by simply extruding the rubbery composition into the desired size and shape. Other shaping techniques commonly used in the thermoplastics processing industry, such as injection molding can also be used to make seals and gaskets with the rubbery compositions of this invention.

This invention is illustrated by the following examples which are merely for the purpose of illustration and are not to be regarded as limiting the scope of this invention or the manner in which it can be practiced. For example, the so called "coreshell" emulsion polymerization technique or graft emulsion polymerization technique could be used instead of the one stage conventional emulsion polymerization technique described heretofore. Unless specifically indicated otherwise, all parts and percentages are given by weight.

EXAMPLE 1

In this experiment a highly crosslinked nitrile rubber was made by using "cold" emulsion polymerization utilizing the techniques of this invention. The polymerization was conducted in a stirred, jacketed reactor having a capacity of 5 liters.

The reactor was charged with 2531 g (grams) of water, 28.6 g of a fatty soap, 2.6 g of $Na_3PO^4$, and 0.44 g of an iron/sodium EDTA complex salt. Then 429 g of acrylonitrile, 1.3 g of t-dodecylmercaptan, 22.75 g of trimethylolpropanetrimethacrylate, and 1.04 g of cumene hydroperoxide were charged into the reactor. The reactor was then evacuated and cooled to a temperature of 10° C. Then 871 g of 1,3-butadiene was added followed by 0.52 g of sodium formaldehyde sulfoxylate.

A temperature of about 10° C. was maintained throughout the polymerization. When a monomer conversion of 95 percent was achieved the reaction was shortstopped by the addition of 0.56 g of diethylhydroxylamine and 9.5 g of sodium dimethyldithiocarbamate. Residual monomers were then removed and the final latex was stabilized with ditertiarybutyl paracresol.

EXAMPLE 2

In this experiment a highly crosslinked nitrile rubber was synthesized by utilizing a "hot" emulsion polymerization technique. In the procedure employed 364 grams of acrylonitrile, 2.6 grams of tertiary dodecyl mercaptan and 11.7 grams of trimethylolpropanetrimethacrylate were added to an aqueous mixture containing 2537 grams of deionized water, 2.6 grams of $Na_3PO_4$, 2.12 grams of sodium dodecylbenzene sulfonate, 3.25 grams of $Na_2SO_4$, 0.78 grams of triethanolamine, and 65 grams of a 45% solution of the sodium salt of naphthalene sulfonic acid. The resulting mixture was then charged into a 5 liter evacuated reactor and 871 grams of 1,3-butadiene was subsequently added.

Polymerization was initiated by the addition of 5.2 grams of potassium persulfate. The polymerization was allowed to proceed at a temperature of 45° C. until a monomer conversion of 80% was achieved. At that point 65 grams of acrylonitrile was slowly added to the reactor. When a conversion of 95% was attained the polymerization was shortstopped by adding 5.2 grams of sodium dimethyldithiocarbamate. Then residual monomers were removed and the latex was stabilized by the addition of an antioxidant (Wingstay® L).

EXAMPLE 3

In the first step of this experiment, a "plasticizer emulsion" was made. In the procedure employed 10.5 grams of oleic acid was added into 420 grams of dioctylphtalate at 60° C. The mixture made was then neutralized under strong agitation by the addition of 4.9 grams of potassium hydroxide (50%) in 435 grams of deionized water. The "plasticizer emulsion" made was then cooled to room temperature.

Then 3000 grams of the stabilized latex made in Example 2 having a solids content of 26% was mixed with 390 grams of the "plasticizer emulsion" for one hour. The latex blend made was then coagulated by the addition of an aqueous solution of magnesium sulfate ($MgSO_4$). The rubber crumb which was recovered was then washed with water and dried at a temperature of 55° C. The crumb was then mixed with calcium carbonate (as a partitioning agent) and ground to obtain a free flow powder.

EXAMPLE 4

In this experiment, 62.5 parts of the free flow powder made by the procedure described in Example 3 (containing 200 parts of pure polymer, 11.2 parts of dioctylphtalate, and 6.2 parts of calcium carbonate) was mixed into a dry blend polyvinylchloride compound (containing 100 parts of polyvinylchloride (K value of 71) 38.7 parts of dioctylphtalate and 3 parts of a Ba/Zn stabilizer). The compound was gelified with a twin screw extruder and injection molded to give test samples having a Shore A hardness of 84, a 100% modulus of 7.2 MPa, a tensile strength of 17 MPa, an elongation at break of 380%, and a compression set of 48% after 22 hours at 70° C. as measured according to ASTM Method D395-89 Method B.

For purposes of comparison, a second composition was prepared utilizing Chemigum®0 PSBA in place of the free flow powder made by the procedure described in Example 3. The composition made had a Shore A hardness of 76, a 100% modulus of 6.1 MPa, a tensile strength of 18 MPa, an elongation at break of 475%, and a compression set of 55% after 22 hours at 70° C.

EXAMPLE 5

In this experiment, 278 parts of a free flow powder made by the procedure described in Example 3 (containing 200 parts of pure nitrile rubber, 50 parts of dioctylphtalate, and 28 parts of calcium carbonate) was fluxed through a twin screw extruder with a dry blend polyvinylchloride compound (containing 100 parts of polyvinylchloride having a K value of 90, 50 parts of dioctylphtalate, 72 parts of calcium carbonate, and 3 parts of a Ba/Zn stabilizer). The rod made was then granulated and injection molded to make test samples having a Shore A hardness of 62, a 100% modulus of 2.6 MPa, a tensile strength of 6.6 MPa, an elongation at break of 330%, and a compression set of 26% after 22 hours at 70° C. as measured according to ASTM Method D395-89 Method B.

For purposes of comparison, a second composition was prepared utilizing Chemigum® P8BA in place of the free flow powder made by the procedure described in Example 3. The composition made had a Shore A hardness of 52, a 100% modulus of 1.7 MPa, a tensile strength of 7 MPa, an elongation at break of 500%, and a compression set of 36% after 22 hours at 70° C.

EXAMPLE 6

In this experiment, a dry blend masterbatch containing 100 parts of polyvinylchloride having a K value of 71, 50 parts of dioctylphtalate, and 3 parts of stabilizer was made using a Henschel mixer. Then 30 parts of powdered nitrile rubber (1 mm diameter) per 100 parts of the polyvinylchloride was added and blended with the masterbatch. The mixture was fluxed by making one or two passes (for gelification) through a Haake Rheomex extruder equipped with a rod die. It was operated utilizing a screw speed of 45 rpm, a zone 1 temperature of 150° C., a zone 2 temperature of 160° C., a zone 3 temperature of 170° C., and a zone 4 temperature of 170° C. The rod was then granulated and the granules produced were extruded through a 1 millimeter thick horizontal slit die for dispersion evaluation.

The results showed that the highly crosslinked nitrile rubber made in Example 1 gives a good dispersion behavior in polyvinylchloride compounds compared to the nitrile rubber made in Example 2. Otherwise, the dioctylphtalate extended nitrile rubber made in Example 3 exhibited a better dispersion behavior than that made in Example 2.

While certain representative embodiments and details have been shown for the purpose of illustrating the subject invention, it will be apparent to those skilled in this art that various changes and modifications can be made therein without departing from the scope of the subject invention.

What is claimed is:

1. A highly crosslinked nitrile rubber composition which can be blended with polyvinyl chloride to make compositions having excellent characteristics for seals and gaskets including dimensional stability, low compression set, and outstanding sealing characteristics, said highly crosslinked nitrile rubber composition being comprised of (1) a highly crosslinked nitrile rubber having repeat units which are derived from (a) about 45 weight percent to about 79 weight percent 1,3-butadiene, (b) from about 20 weight percent to about 50 weight percent acrylonitrile, and (c) from about 0.5 weight percent to about 5 weight percent of a crosslinking agent, wherein said highly crosslinked nitrile rubber has a Mooney viscosity of about 50 to about 120, a swelling index of less than about 10 percent, a mill shrinkage of less than 10 percent, and a gel content of greater than 95 percent; and (2) from about 1 to about 30 phr of a plasticizer.

2. A highly crosslinked nitrile rubber composition as specified in claim 1 wherein the highly crosslinked nitrile rubber has a swelling index of less than about 7%, a mill shrinkage of less than about 8%, and a Mooney viscosity of about 55 to about 110.

3. A highly crosslinked nitrile rubber composition as specified in claim 2 wherein the crosslinking agent is trimethylol propane trimethacrylate.

4. A highly crosslinked nitrile rubber composition as specified in claim 3 wherein the repeat units in the highly crosslinked nitrile rubber are derived from (a) about 58 weight percent to about 71 weight percent 1,3-butadiene, (b) from about 28 weight percent to about 38 weight percent acrylonitrile, and (c) from about 1 weight percent to about 4 weight percent of the crosslinking agent.

5. A highly crosslinked nitrile rubber composition as specified in claim 4 wherein the highly crosslinked nitrile rubber has a mill shrinkage of less than about 5%.

6. A highly crosslinked nitrile rubber composition as specified in claim 5 wherein the repeat units in the highly crosslinked nitrile rubber are derived from about 1.5 weight percent to about 3.5 weight percent of the crosslinking agent.

7. A highly crosslinked nitrile rubber composition as specified in claim 2 wherein the crosslinking agent is selected from the group consisting of ethylene glycol methacrylate, trimethylol propane trimethacrylate, divinylbenzene, and 1,4-butanediol dimethacrylate.

8. A highly crosslinked nitrile rubber composition as specified in claim 4 wherein from about 5 phr to about 20 phr of the plasticizer is present.

9. A highly crosslinked nitrile rubber composition as specified in claim 8 wherein the plasticizer was mixed with the highly crosslinked nitrile rubber by blending a latex of the highly crosslinked nitrile rubber with an emulsion of the plasticizer and subsequently cocoagulating the blended latex to recover the rubbery composition.

10. A highly crosslinked nitrile rubber composition as specified in claim 8 wherein the highly crosslinked nitrile rubber composition has excellent compatibility and dispersion behavior in polyvinylchloride.

* * * * *